July 1, 1969     L. W. SZYMANSKI     3,452,726

UNTHROTTLED ENGINE COMBUSTION SYSTEM

Filed May 11, 1967

INVENTOR
LEONARD WATTS SZYMANSKI

BY
ATTORNEY

United States Patent Office 3,452,726
Patented July 1, 1969

3,452,726
UNTHROTTLED ENGINE COMBUSTION SYSTEM
Leonard W. Szymanski, Niles, Ill., assignor to Borg-Warner Corporation, Chicago, Ill., a corporation of Illinois
Filed May 11, 1967, Ser. No. 637,798
Int. Cl. F02b 19/04, 19/10; F01l 3/06
U.S. Cl. 123—32                                                5 Claims

ABSTRACT OF THE DISCLOSURE

An unthrottled internal combustion engine comprising a piston having an irregular crown defining two combustion chambers operable in a cylinder and being provided with intake and exhaust valves, a spark plug effective to initially ignite gas in one of the chambers and fuel injection means positioned in a manner such that a rich fuel mixture is provided in the chamber in which the initial ignition occurs.

BACKGROUND OF THE INVENTION

Field of the invention

This invention resided in the field of unthrottled internal combustion engines.

Description of the prior art

Patent No. 3,079,901 appears to be the nearest prior art pertaining to this invention. It comprises a piston having an irregular crown, which, at approximately top dead center defines an auxiliary ignition chamber and a residual combusion chamber that are limited as to intercommunication by the space between the walls of the auxiliary ignition chamber and the cylinder head.

This invention also comprises a piston having an irregular crown which, however, is arranged in a manner such that two levels are provided; viz. the uppermost one or plateau level which is provided with a cavity communicable with the other one or lower level, thereby patentably distinguishes from the above reference in that intercommunications between the two chambers at approximately the top of the piston stroke, is not restricted to the limitations shown in the above reference. This is an important distinction which, hereinafter will be more fully described.

SUMMARY OF THE INVENTION

A preferred embodiment of this invention comprises a piston having an irregular crown operable in a cylinder which is closed by a cylinder head. Exhaust and intake poppet valves are provided, the former not shown, and the latter serving to provide air only. The irregular crown of the piston is formed in a manner such that an upper level and a lower level are formed. The upper level which may be termed the plateau level is provided with a cavity in direct communication with the lower level thereby defining at substantially the top of the piston stroke an auxiliary ignition chamber, the area provided by the cavity, and a residual combustion chamber, the area provided by the lower level.

An injector nozzle if positioned in a manner such, that during some point in the compression stroke, fuel is directed into the auxiliary ignition chamber thus providing a localized air fuel charge which is ignited by spark plug means at a predetermined time of the compression stroke.

It is extremely important that a chemically correct mixture of fuel and air is provided over the entire load range in the operation of the engine.

The arrangement of the irregular crown of the piston in this invention, together with the other components as shown is for the purpose of securing the best possible fuel and air mixture. This arrangement produces a squish action at the top of the compression stroke because of the close proximity of the face of the plateau level to the face of the cylinder head, which contributes to the attainment of a desired goal; namely, a stoichiometric air and fuel mixture. To further enhance this goal a shroud may be provided on the intake poppet valve, thereby producing air turbulence immediately as the air flows into the cylinder on the intake.

This invention consists of the novel constructions, arrangements and devices to be hereinafter more fully described and claims for carrying out the novel features of the invention as will be apparent from the following description of a preferred form of this invention, illustrated with reference to the accompanying drawings, wherein:

Figure 1:
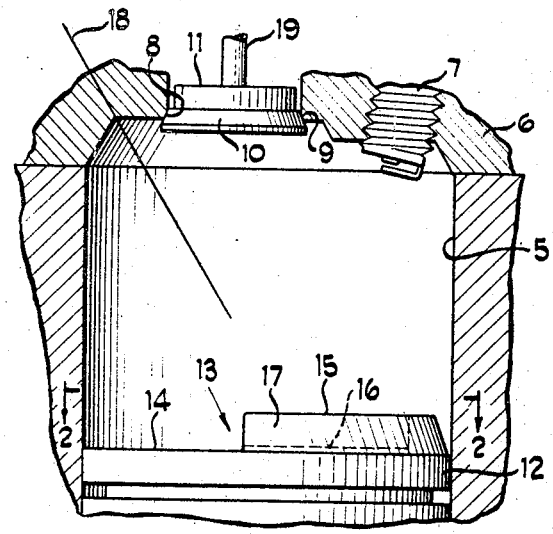
FIGURE 1 is a schematic view of the components showing their arrangement according to the present invention.

FIGURE 1 shows a cylinder 5 covered by a cylinder head 6 provided with a spark plug 7 and an intake port 8 including a valve seat 9. An intake poppet valve head 10 carries a shroud 11 operably associated with the intake port 8.

A piston 12 operable in the cylinder 5 has an irregular crown 13 comprising a lower level 14 and an upper level 15 which may be termed the plateau level which is provided with a cavity 16 directly communicable with the lower level 14. That portion of the cavity 16 providing communication with the lower level 14 may be termed a passage 17. An injection nozzle 18, shown schematically, serves to supply fuel to the cylinder 5 and at a predetermined position of the piston 12, during the compression stroke, directs fluid into the cavity 16 whereby at substantially the top of the piston stroke the cavity 16 provides a pocket having a rich air fuel mixture which is ignited by the spark plug 7.

Figure 4:
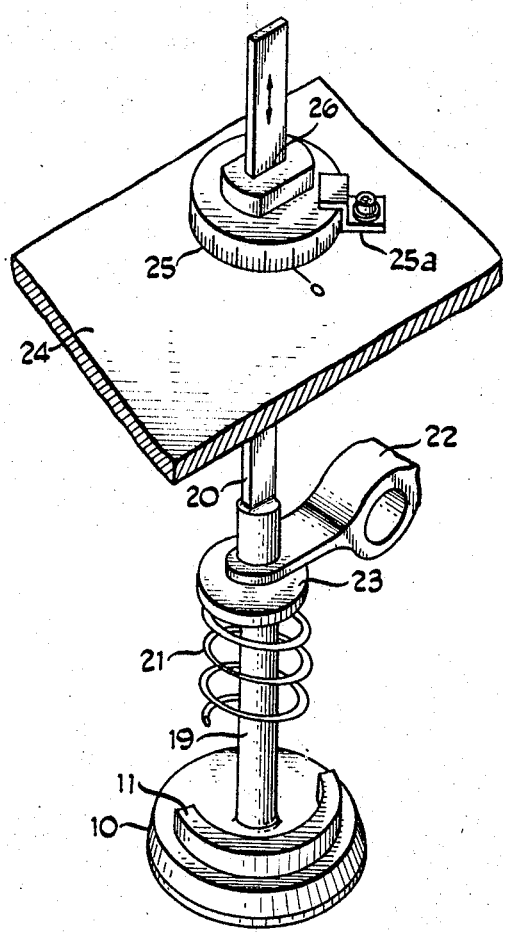
FIGURE 4 is a perspective view of the intake poppet valve and shroud and other components shown schematically.

FIGURE 4 shows the intake poppet valve head 10 including an intake poppet valve stem 19 having a rectangular shaped end 20 and carries the shroud 11 together with related components shown schematically which comprise a valve spring 21, a rocker arm 22 and a washer 23 interposed between the rocker arm 22 and the valve spring 21 and a valve cover 24 which carries a rotatably adjustable valve stem guide 25 having a rectangular shaped opening 26 therein, slideably engageable with the rectangular shaped end 20 of the intake poppet valve stem 19 thereby preventing the intake poppet valve stem 19 from rotating which includes the shroud 11 which is connected to the intake poppet valve head 10. A fastening clamp 25a is provided.

Figure 2:
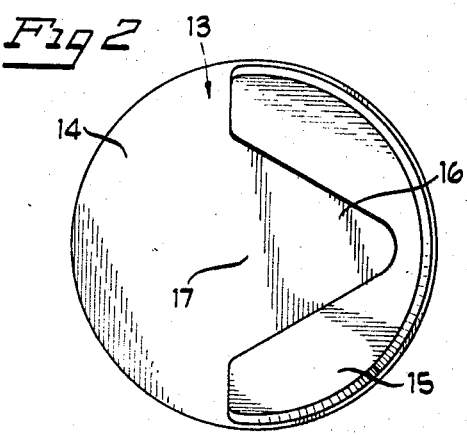
FIGURE 2 is a planned view of the irregular crown of the piston shown in FIGURE 1.
Figure 3:
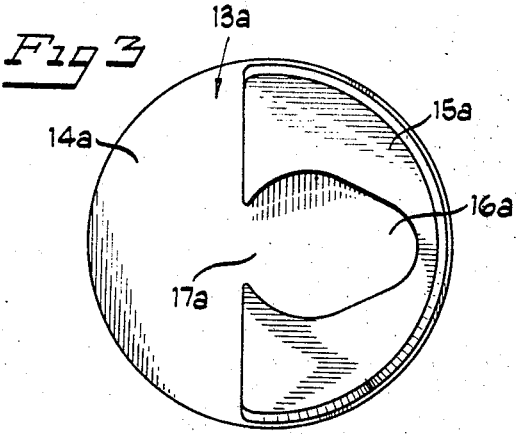
FIGURE 3 shows a modified form of the irregular crown shown in FIGURE 2.

FIGURE 3 shows a modified form of the irregular crown 13 identified as 13a, the units of which carry the same identifying numbers as in FIGURE 2, but are specifically identified by the addition of a letter a. The modification of the irregular crown 13 resides in the constriction of the passage 17a as compared with the passage 17.

These passages 17 and 17a permit the entry of fuel into the cavities 16 and 16a respectively over a longer range of travel of the piston 12 during the compression stroke as compared to the prior art referred to herein, Patent No. 3,079,901, thereby assuring a rich fuel mixture in the cavity 16 or 16a depending on which cavity is provided at top dead center of the piston stroke.

OPERATION

In the operation of an unthrottled internal combustion engine, the fuel and air mixture occurs in the cylinder and not in a carburetor as is the case in an Otto Cycle engine. Therefore, the problem of providing a stoichiometric mixture of fuel and air at all load levels arises.

In this invention, the geometry of the piston crown and its relationship to the other components, including a fuel injector, and their coordination, is such so as to accomplish as near as possible the optimum of fuel and air mixture at all load levels.

Specifically, when the engine is started initially, the intake poppet valve head 10 opens and air is introduced into the cylinder 5 in a state of turbulence initiated by the shroud 11. Fuel is then injected into the cylinder 5 at substantially the bottom of the compression stroke and in a manner such, that a rich fuel mixture is provided in the cavity 16 which at the top of the stroke may be termed a pocket, thereby providing the auxiliary combustion chamber, wherein the fuel mixture is ignited by the spark plug 7. Currently available electrical means, not shown, is used to provide the electrical current. The proximity of the face of the plateau level provides a squish action adding to the turbulence in the air fuel mixture in the auxiliary ignition chamber into which the combustion moves progressively.

I claim:
1. An unthrottled internal combusion engine comprising:
   (A) a cylinder;
   (B) a piston operable in said cylinder having an irregular crown comprising a substantially flat face having a raised U-shaped boss potrion with a flat top face comprising legs extending substantially half way around the periphery of the said piston thereby defining an auxiliary ignition space in communication with the remainder of the said flat face which provides a residual combustion space;
   (C) a spark plug extending into the said auxiliary ignition space at substantially the top of the piston stroke;
   (D) a cylinder head covering said cylinder;
   (E) an intake poppet valve operable in said cylinder head in communication with said cylinder, said intake poppet valve serving to provide air only; and
   (F) a fuel injection nozzle serving to inject fuel into the said cylinder at substantially the bottom of the compression stroke and directed in a manner such that a rich fuel mixture is provided in the said auxiliary ignition space.

2. An unthrottled internal combustion engine according to claim 1, wherein the said intake poppet valve is provided with a shroud serving to provide air turbulence in the said cylinder.

3. An unthrottled internal combustion engine according to claim 1, wherein the said poppet valve is provided with a guide, serving to prevent rotation of the poppet valve.

4. An unthrottled internal combustion engine according to claim 3, wherein the said guide is rotatably adjustable.

5. An unthrottled internal combustion engine according to claim 1, wherein the said legs extend toward each other at their ends.

References Cited

UNITED STATES PATENTS

| | | | |
|---|---|---|---|
| 2,837,067 | 6/1958 | Meurer | 123—32 |
| 3,079,901 | 3/1963 | Hallberg | 123—32 |
| 3,107,658 | 10/1963 | Meurer | 123—32 |
| 3,304,922 | 2/1967 | Hideg | 123—32 |

LAURENCE M. GOODRIDGE, *Primary Examiner.*

U.S. Cl. X.R.

123—75